Patented June 18, 1946

2,402,485

UNITED STATES PATENT OFFICE 2,402,485

CATALYTIC POLYMERIZATION OF UNSATURATED ESTERS

David E. Adelson, Berkeley, Calif., Robert P. Ruh, Columbus, Ohio, and Harold F. Gray, Jr., Berkeley, Calif., assignors to Shell Development Company, San Francisco, Calif., a corporation of Delaware No Drawing. Application June 14, 1943, Serial No. 490,953

6 Claims. (Cl. 260—80)

This invention relates to a process for the catalytic polymerization of unsaturated esters. More particularly, the invention pertains to polymerization of allyl esters and related compounds, the polymerization being effected catalytically by the presence of a metal salt.

Unsaturated esters of the type of allyl acetate obtainable from a monocarboxylic acid which is devoid of any polymer-promoting unsaturated group and an unsaturated alcohol having an olefinic linkage between two carbon atoms one of which is directly linked to a saturated carbon atom having the hydroxyl group linked directly thereto, are compounds which may be termed difficultly polymerizable substances owing to the fact that polymer formation from these compounds occurs only very slowly or under drastic conditions. While the action of heat, light, or peroxidic substances has been used to obtain polymers of this type, none effects rapid polymerization of the compounds and each of such catalysts is accompanied with certain disadvantages which are overcome by the present invention.

It is an object of the present invention to provide a method of polymerizing allyl acetate and related compounds.

Another object is to provide a process for obtaining polymers of unsaturated esters of the type of allyl acetate employing as catalytic agent therefor a new metal salt.

A further object is to provide a novel polymerization catalyst.

These and other objects will be apparent from the description of the invention given hereinafter.

We have now discovered that allyl acetate and related compounds are catalytically polymerized when heated in the presence of bismuth trifluoride. The catalytic effect of bismuth trifluoride is illustrated by the results tabulated below, which were obtained in polymerizing allyl acetate, a difficultly polymerizable ester, in the presence of this substance. Substantially pure and anhydrous monomeric allyl acetate was boiled and refluxed in the presence of about 0.5% bismuth trifluoride and the course of the polymerization was followed by observation of the refractive index of the reaction mass taken from time to time after starting the heating. The refractive index of the polymer, which was polyallyl acetate, is higher than that of the monomer so that an increase of refractive index is indicative that polymerization was occurring. A blank to which no salt was added was similarly heated for comparison. The values given in the body of the table are the increase in fourth decimal place units of the refractive index ($\Delta n20/D \times 10^4$) for the indicated time from start.

| Hours | Blank | Bismuth trifluoride |
|---|---|---|
| 66 | 16 | |
| 88 | | 68 |
| 118 | 16 | |
| 182 | 20 | |
| 202 | | 92 |
| 294 | 29 | |
| Average rate of increase in units per hour | 0.122 | 0.564 |

The increase in refractive index is approximately proportional to the rate of polymer formation and the results of the table show that the presence of the bismuth trifluoride gave almost a five fold increase in rate of polymer formation.

The compounds polymerized according to the process of the invention are unsaturated esters of a monocarboxylic acid, which esters contain a single olefinic bond. Although the salts catalyze polymerization of any polymerizable unsaturated compound, the esters employed are those of monocarboxylic acids devoid of any polymer-promoting group such as esters of acrylic acid, crotonic acid, cinnamic acids, etc. The esters are derived from a mono-unsaturated alcohol having an olefinic linkage between two carbon atoms one of which contains at least one hydrogen atom linked directly thereto and one of which is linked directly to a saturated carbon atom containing the hydroxyl group linked directly thereto. Preferably the ester is derived from a mono-unsaturated alcohol containing a vinylidene group directly linked to a saturated carbon atom to which is linked the hydroxyl group. Unsaturated esters of aromatic acids, such as benzoic acid, toluic acid, and the like, are included within the purview of the invention since the lack of saturation of the carbon atoms in the aromatic ring of such compounds is responsible for no polymerizable unsaturated groups therein because of the well-known peculiarities of aromatic nuclei. The esters of saturated monocarboxylic acids constitute a preferred group and while esters of simple saturated acids are particularly preferred, also included are those esters of saturated aliphatic acids wherein one or more hydrogen atoms have been substituted by a halogen atom, a hydroxyl group, an alkoxy group, an aryloxy group and like groups. Among the preferred reactants are included such compounds as allyl formate, allyl acetate, allyl propionate, allyl isobutyrate, beta-methylallyl acetate, beta-chlorallyl acetate, beta-ethylallyl formate, beta-phenylallyl acetate, beta-methoxyallyl acetate, beta-chloromethylallyl acetate, allyl benzoate, beta-methylallyl propionate, allyl toluate, allyl salicylate, allyl glycolate, allyl methoxyacetate, beta-methylallyl chloracetate, allyl beta-chloropropionate, allyl lactate, allyl naphthenate, beta-methylallyl chlorobenzoate, allyl alpha-hydroxyisobutyrate, allyl acetylglycolate, allyl stearate, allyl levulinate, beta-methylallyl butyrate, alpha-methylallyl acetate, alpha-phenylallyl acetate, allyl ethoxyformate, beta-methylallyl phenoxyformate, allyl naphthoate, allyl ester of hydrogenated abietic acid, and the like.

The preferred compounds of the group may be represented by the general formula

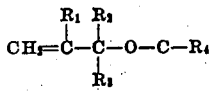

wherein $R_1$, $R_2$ and $R_3$ represent hydrogen atoms, halogen atoms or hydrocarbon radicals and $R_4$ represents a hydrogen atom or an organic radical devoid of a polymerizable unsaturated group, such as an alkyl group, an aryl group, an alicyclic group, an aralkyl group, an alkoxy group, an aryloxy group, and the like.

Less preferred esters include compounds like crotyl acetate, crotyl propionate, crotyl benzoate, 2-hexenyl acetate, 2-pentenyl formate, 2-isopentenyl chloracetate, methyl isobutenyl carbinyl butyrate, and similar types of ester.

The polymerization is effected by heating the unsaturated ester under anhydrous conditions in the presence of or in contact with the catalyst salts at a temperature of 50° C. to 150° C. with the ester in the liquid phase. With unsaturated esters of sufficiently low melting point so that they are liquid under the reaction conditions, the ester is polymerized in the process per se. The use of higher esters requires the use of an inert solvent in order to have the reaction mixture liquid in effecting the polymerization. For this purpose solvents such as saturated esters like ethyl acetate, isopropyl acetate, butyl acetate, etc.; hydrocarbons like benzene, toluene, hexane, octanes, etc.; ethers like dioxane, dibutyl ether, beta-dichlorodiethyl ether, etc., are admixed with the unsaturated ester subjected to polymerization. In general, however, it is preferred to avoid the use of solvents or diluents where possible since they complicate the recovery problem in obtaining the polymer and decrease the rate of the polymerization reactions. It is preferred to employ as reactant an unsaturated ester which is liquid under the reaction conditions as is realized with lower esters or esters of lower unsaturated alcohols. These preferred reactants contain not more than 7 carbon atoms in the unsaturated ester.

While the bismuth trifluoride employed as catalyst dissolves to a greater or lesser extent in the reaction material depending to some extent upon the particular reactant, the salt is normally soluble in only minute amounts so that the reaction mixture is contacted with a catalyst as a crystalline substance. For this reason it is preferable to utilize the salt in the finely divided or comminuted state. Amounts of catalyst from a few hundredths per cent to 5 or more per cent are effective in catalyzing the reactions. In general, the rate of polymerization increases somewhat with increasing amounts of catalysts. Further, it is ordinarily desirable to add the catalyst intermittently during the course of the heating rather than adding the whole amount at the start, since this also has a favorable effect on the rate of polymer formation.

The bismuth trifluoride has advantages in polymerizing the unsaturated esters not realized with known peroxidic catalysts such as benzoic peroxide, one of the most commonly used materials for this purpose. Since the salt is essentially insoluble in the reaction mixture, polymer obtained is not contaminated with undesirable material such as benzoic acid and other decomposition products obtained when benzoyl peroxide is utilized. Further, upon completion of polymerization operation the catalyst is recovered by filtering from the reaction mixture and can be used again in the process. The use of peroxidic substances such as peroxides and persalts which liberate oxygen give polymers wherein the monomer units of the polymer molecule contain oxygen linkages which are probably ethereal in nature rather than having the monomer units linked by carbon-to-carbon bonding.

In executing the process of the invention the unsaturated ester to which has been added an amount of catalyst is heated to between 50° C. and 150° C., and the heating continued until the desired degree of polymerization has occurred. The polymers of the unsaturated esters are linear polymers which are soluble generally in the monomeric material. After 25% to 35% or more of the reactant has been converted to polymer, as may be determined by observation of increase of the refractive index, the heating is discontinued and the reaction material filtered to remove catalyst. The filtered material is then subjected to distillation to separate unreacted monomers, the polymers remaining as residue. If desired, any trace of catalyst salt or other material retained by the polymer is removed by water-washing. It is usually desirable to choose a reactant which will boil within the range of reaction temperature whereby the polymerization is effected by refluxing the material in the presence of the catalyst. The presence or absence of oxygen appears to have no significant effect on the rate of the polymerization reaction when the catalysts of the present invention are employed. In some cases it is desirable to add intermittently fresh catalyst to the reaction material during the course of the heating rather than adding the entire amount at the start.

Another method of effecting the reaction which is adapted for continuous production of polymer with the catalyst salts is to pass the liquid reactant material through a bed of the salt. In adapting this procedure to continuous operation the organic material is circulated through a bed of the catalyst maintained at the desired temperature, and monomeric ester is fed into the cycling system while material is withdrawn therefrom, the withdrawn portion being a mixture of polymer and monomer from which the monomer is recovered for return to the cycling system.

The polymers prepared according to the invention have application as plasticizers and softeners for various materials. Further, the solubility in various substances makes the polymeric esters useful intermediates in the synthesis of polymeric alcohols which may be prepared by hydrolysis or saponification of the polymers.

We claim as our invention:

1. A process for the production of a polymer of an ester of a monocarboxylic acid and a monohydric alcohol having an olefinic linkage between two carbon atoms one of which contains at least one hydrogen atom linked directly thereto and the other of which is linked directly to a saturated carbon atom having the hydroxyl group linked directly thereto, said ester containing only double-bonded unsaturation and no other elements than carbon, hydrogen, oxygen and halogen, and also containing but a single olefinic linkage therein which comprises heating the ester in liquid phase under anhydrous and non-oxidizing conditions at a temperature between 50° C. and 150° C. in the presence of bismuth trifluoride for a time sufficient to effect appreciable polymerization of the ester.

2. A process for the production of a polymer of an ester of a saturated monocarboxylic acid and a mono-olefinic monohydric alcohol having a vinylidine group directly linked to a saturated carbon atom to which is directly linked the hydroxyl group, said ester containing only double-bonded unsaturation and no other elements than carbon, hydrogen, oxygen and halogen, which comprises heating the ester in liquid phase under anhydrous and non-oxidizing conditions at a temperature between 50° C. and 150° C. in the presence of bismuth trifluoride for a time sufficient to effect appreciable polymerization of the ester.

3. A process for the production of polyallyl acetate which comprises boiling allyl acetate at atmospheric pressure under anhydrous and non-oxidizing conditions in the presence of bismuth trifluoride for a time sufficient to effect appreciable polymerization of the allyl acetate.

4. A process for the production of a polymer of an allyl ester of a saturated monocarboxylic acid, said ester containing not more than 7 carbon atoms, which comprises heating the ester in liquid phase under anhydrous and non-oxidizing conditions at a temperature between 50° C. and 150° C. in the presence of bismuth trifluoride for a time sufficient to effect appreciable polymerization of the ester.

5. A process for the production of polymethallyl acetate which comprises boiling methallyl acetate at atmospheric pressure under anhydrous and non-oxidizing conditions in the presence of bismuth trifluoride for a time sufficient to effect appreciable polymerization of the methallyl acetate.

6. A process for the production of polyallyl acetate which comprises heating allyl acetate in liquid phase at a temperature between 50° C. and 150° C. under anhydrous and non-oxidizing conditions in the presence of bismuth trifluoride for a time sufficient to effect polymerization of about 25% to 35% of the allyl acetate.

DAVID E. ADELSON.
ROBERT P. RUH.
HAROLD F. GRAY, Jr.